United States Patent

[11] 3,610,974

| [72] | Inventor | Keith E. Kenyon<br>12943 Dickens St., Studio City, Calif. 91604 |
|---|---|---|
| [21] | Appl. No. | 647 |
| [22] | Filed | Jan. 5, 1970 |
| [45] | Patented | Oct. 5, 1971 |

[54] DYNAMO-ELECTRIC STEPPING ARRANGEMENT
8 Claims, 6 Drawing Figs.

[52] U.S. Cl. .................................... 310/49,
310/154, 310/180, 310/266
[51] Int. Cl. ........................................ H02k 37/00
[50] Field of Search............................ 310/181,
199, 180, 266, 49, 179, 267, 105, 154, 155, 67, 14

[56] References Cited
UNITED STATES PATENTS

| 295,368 | 3/1884 | Dennis | 310/266 |
| 1,231,193 | 6/1917 | Powers | 310/14 |
| 2,849,630 | 8/1958 | Waloff | 310/154 |
| 3,290,528 | 12/1966 | Adler | 310/154 |
| 3,467,847 | 9/1969 | Faulhaber | 310/266 |
| 3,514,654 | 5/1970 | Moresi | 310/266 |

*Primary Examiner*—D. X. Sliney
*Assistant Examiner*—R. Skudy
*Attorney*—Roger A. Marrs ABSTRACT: Dynamo-electric stepping arrangement including at least one annular, inner permanent magnet composed of a pair of semicircular segments disposed within a circular hollow outer permanent magnet similarly composed of a pair of semicircular segments whereby the opposing poles of the magnets are arranged adjacent each other in magnetic repulsion so as to create a high-density magnetic field about the inner and outer magnets approximately 180° apart. A pair of coil carried on respective quadrants are encircled about a portion of the inner magnet so as to move about the magnet between the inner and the outer magnets. A current device is operably connected to the coils for selectively and periodically pulsing the coils so as to establish an attractive magnetic force at the respective leading ends of the coils whereby the coils and hence, the quadrants, will move in a rotary manner. By mounting the quadrants on a shaft, a work output may be generated.

KEITH E. KENYON
INVENTOR.

BY Roger A. Marrs

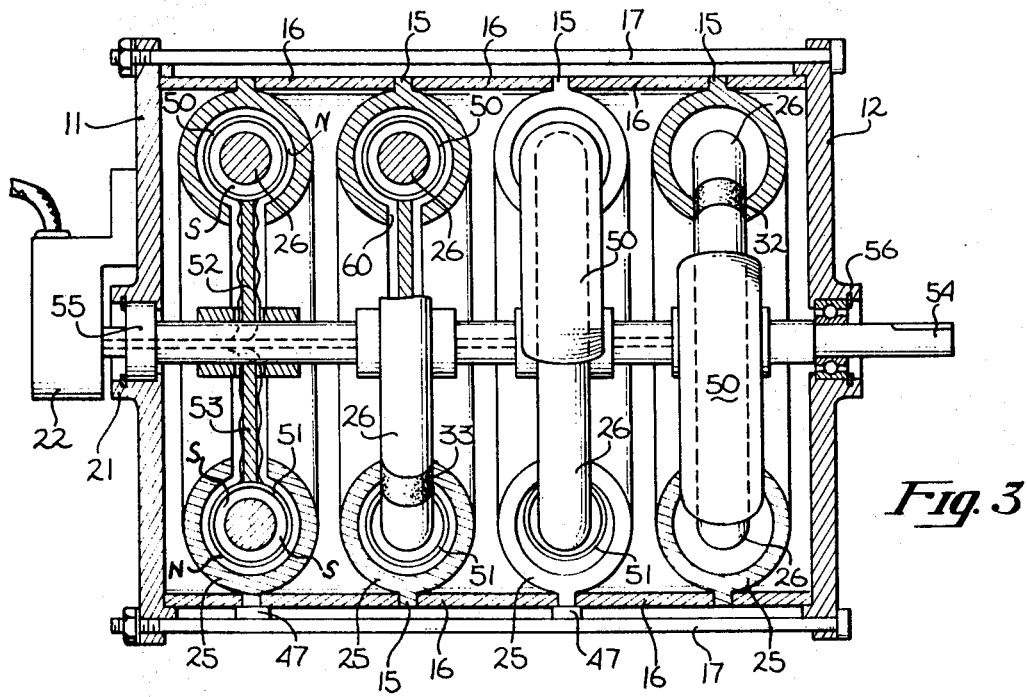
Fig. 3
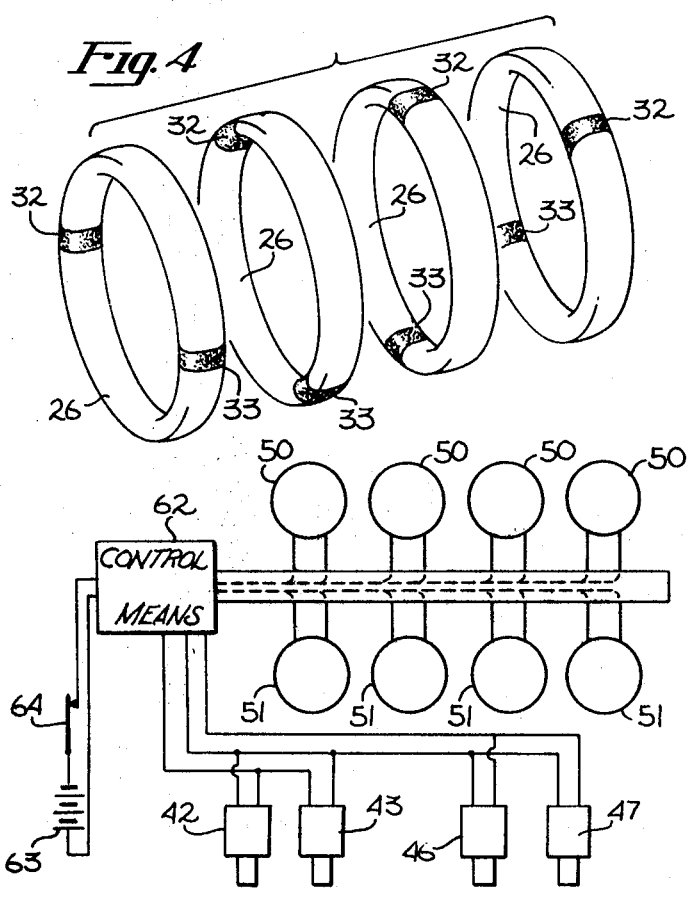
Fig. 4
Fig. 6
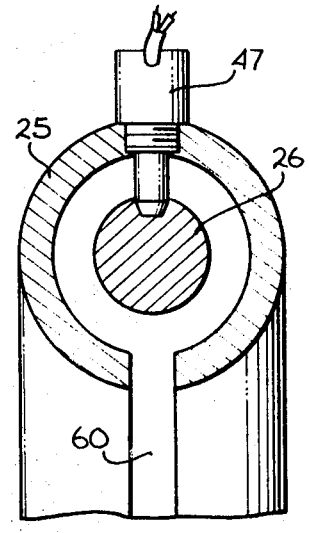
Fig. 5
KEITH E. KENYON
INVENTOR.
BY
Roger A. Marrs

DYNAMO-ELECTRIC STEPPING ARRANGEMENT

BACKGROUND OF THE INVENTION

1. Field of the Invention

A dynamo electric stepping arrangement wherein by controllably coordinating adjacent magnetic fields sufficient magnetostatic force is generated to perform useful work.

2. Description of the Prior Art

Man's improved technology has wrought tremendous advances in many fields and, in particular, the science of magnetism influences almost every field of human activity. The wide and varied uses of the properties of magnetism form an integral, essential component of navigational and surveying instruments and the very heart of most electric motors and instrumentation. Almost all electronic equipment utilizes features of magnetism either directly or in the supplying circuits therefor.

Although magnetism is one of the oldest forces known to man, little has been done to harness the natural forces of magnetism in the form of a practical and efficient power source. Generally, power sources, such as motors and generators, for example, are presently being designed and fabricated by conventional methods and to standards which have been in use for many years. These designs and methods usually involve the conversion of electrical energy into mechanical work by employing such elements as field poles, armatures, condensers and brushes.

In some instances, involving extremely small power outputs, magnetic forces have been employed in such devices as blenders and mixers; however, these devices are totally unsuitable for developing sufficient power to operate under conditions requiring a substantial loading of the power source such as may be used for a wide variety of tasks as in pumps, vehicle propulsion, and other mechanical and hydraulic apparatus when the power source is heavily loaded at all times. Furthermore, such conventional devices, although using natural magnetic forces, also include electromechanical or electromagnetic devices in combination therewith.

Improvement in primary power sources incorporating natural magnetic force techniques which are permitted by modern technological approach and conceptual improvement can readily reduce the cost of such primary power sources and make the power sources more durable, long lived and more compact by effecting the controlled distortion of the magnetic lines of force so that a significant differential in flux density results whereby the known laws of magnetic attraction and repulsion can then be applied to effect major mechanical displacement.

In the past, several attempts have been made to effect a controlled distortion of magnetic lines of force employing permanent magnets arranged in juxtaposition with respect to each other that may be physically or electromechanically operated to obtain a desired flux density pattern suitable to cause mechanical displacement to take place between the magnets. One such attempt is set forth in the disclosure of U.S. Letters Pat. No. 1,724,446 which provides fir intermittently introducing a shunt into the magnetic flux field of one of a pair of magnets arranged in juxtaposition relationship to create an attracting magnetic field and then withdrawing the shunt to create a repulsive magnetic field to cause one of said magnets to be alternately attracted to and repelled from the other magnet.

However, difficulties and problems have been encountered by such conventional devices that stem largely from the fact that means are required to physically move the shunt into and out of the magnetic flux density pattern at precisely timed intervals; otherwise the efficiency and usefulness of the device as a power source is obviated. In some instances, such shunt actuation means operate electromagnetically which necessitates an external supply of electrical potential. Obviously, such means as are required by conventional magnetic power source devices represent relatively complex structures involving ancillary power and critical programming means so that the devices cannot be said to operate and function by employing pure utilization of natural magnetic forces.

Accordingly, the novel magnetic power source of the present invention obviates the difficulties and problems encountered by conventional power sources by providing means for establishing a concentrated magnetic force field along movable, alternating positions in circular path so as to effectively react in cooperation with the magnetic field of permanent magnets whereby the attraction and repulsion of the magnetic fields for each other may be converted into mechanical movement. In one embodiment of the present invention, the magnetic power source provides an annular permanent magnet made from a pair of semicircular magnets having a north pole and a south pole established 180° apart and another hollow permanent magnet arranged in fixed spaced relationship about the firs mentioned magnet having a similar polar arrangement. A pair of quadrant coils are supported on a rotatable shaft about the first mentioned, annular magnet so as to be movable disposed thereabout within the space between the annular magnet and its surrounding permanent magnet.

I have discovered that by subjecting the quadrant coil members to periodic and controlled energization by application of current through the coils, an attractive magnet field is established immediately preceding or ahead of an opposite magnetic field and a repulsive field behind having a different polarity as established by the cooperative and cumulative effect of the permanent magnet. The natural attraction of the opposite magnetic fields will cause the rotatably mounted coil elements to travel in the direction of the attractive force. Obviously, by mounting the coil quadrants onto a rotatable shaft, the shaft will turn in response to the attractive magnetic force of the moving coil quadrants so that mechanical movement is effected. By providing a plurality of stages which are staggered with respect to magnetic polarities, a continuous rotary motion or movement can be developed so that continuous and smooth work output may be derived from the shaft.

Therefore, it is among the primary objects of the present invention to provide a magnetic power source means employing the natural magnetic forces of attraction and repulsion of permanent magnets for each other which may be converted into mechanical motion by employing a movable coil element adapted to selectively generate a periodic magnetic flux density at critical locations or positions along the circular path of permanent magnets so as to create an attracting magnetic field.

Another object of the present invention is to provide a novel magnetic power source that employs the natural forces of magnetism to create mechanical movement between permanent magnets and an electromagnet in the form of a coil surrounding an annular permanent magnet whereby relative movement between the electromagnet and the permanent magnet is effected upon and in response to selective energization of the electromagnet.

Another object of the present invention is to provide a novel magnetic power source or motor as well as a generator as a correlary that may readily employ the natural magnetic forces available through the use of a permanent magnet and an electromagnet to create rotary movement between spaced apart magnetic means having their pole pieces arranged in opposing juxtaposition relationship as well as a moving relationship.

Still another object of the present invention is to provide a novel magnetic power source, motor or generator employing natural magnetic forces having a sufficient amount of torque created thereby to perform useful work under relatively high load conditions.

Another object of the present invention is to provide a novel magnetic power source or motor that is economical to manufacture and which employs a minimum number of parts or components utilizing permanent magnets, coils and other material readily available on the commercial market.

Another object of the present invention is to provide a novel power source utilizing the natural force of magnetism to effect mechanical displacement between opposing elements for either rectilinear or rotary movement.

It is another object of the present invention to provide a novel power source utilizing the natural force of magnetism to produce substantial power under operational loading conditions to effect rotary or rectilinear displacement between adjacent mechanical members arranged in close proximity.

Still a further object of the present invention is to provide a novel magnetic motor whereby the attraction and repulsion of permanent magnets for each other may be converted into motion by selectively energizing a coil or pair of coil elements mounted on a rotatable shaft so that the pulsing of the coil element occurs at critical locations with respect to permanent magnets so as to create a magnetostatic driving force.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description taken in connection with the accompanying drawings, in which:

FIG. 3 is a longitudinal cross-sectional view of the power source illustrated in FIG. 2 as taken in the general direction of arrows 3—3 thereof;

FIG. 4 is an exploded perspective view showing the staggered arrangement of annular permanent magnets employed in the power source shown in FIGS. 1-3;

FIG. 5 is an enlarged view of a suitable means for releasably supporting each of the annular magnets as taken in the direction of arrows 5—5 of FIG. 2; and FIG. 6 is a schematic drawing of a circuit including control means for selectively energizing the coil elements included in the present invention as well as the magnet supporting means.

DESCRIPTION OF THE PREFERRED EMBODIMENT

Figure 1:
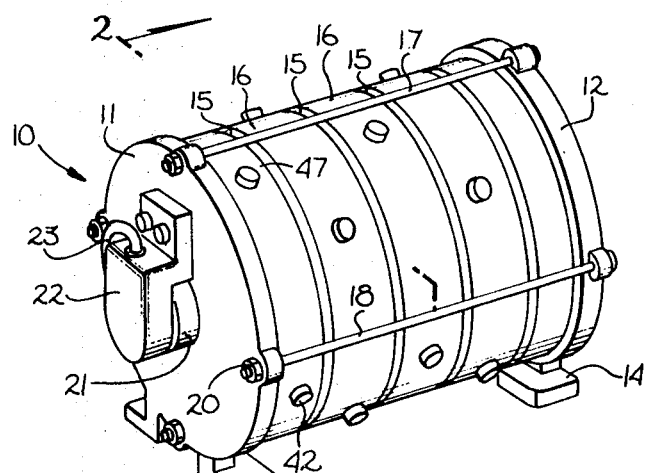
FIG. 1 is a perspective view of one embodiment of a power source employing the natural forces of magnetism in accordance with the present invention.

Referring to FIG. 1, a magnetic power source is illustrated in the general direction of arrow 10 which includes a pair of end plates 11 and 12 having base feet 13 and 14 for supporting the power source on a suitable foundation. The end plates are spaced apart and separated by elements of the device such as support elements 15 and spacers 16. Tie rods, as indicated by numerals 17 and 18, communicate between the end plates so as to compress the elements 15 and spacers 16 together when fastened by means of nuts 20. A bearing means is enclosed within the housing 21 carried on both ends of the plates and suitable electrical commutating and control circuits are contained within housing 22 adjacent housing 21 on plate 13. A cable 23 connects the circuits and commutator within housings 21 and 22 to a suitable source of power. toroidal partially Referring now to FIG. 2, a transverse cross-sectional view of the apparatus is shown in an enlarged illustration. The support elements 15 are disposed between adjacent opposing sides of spacers 16 from a ridge about a hollow toroidal magnet 25. In FIG. 3, for example, it can be seen that the magnet 25 is solely supported by the compressive force of nonmagnetic spacers 16 against the element 15. Also, it can be seen that the internal bore or hollow of magnet 25 is partially occupied by an annular magnet 26.

Figure 2:
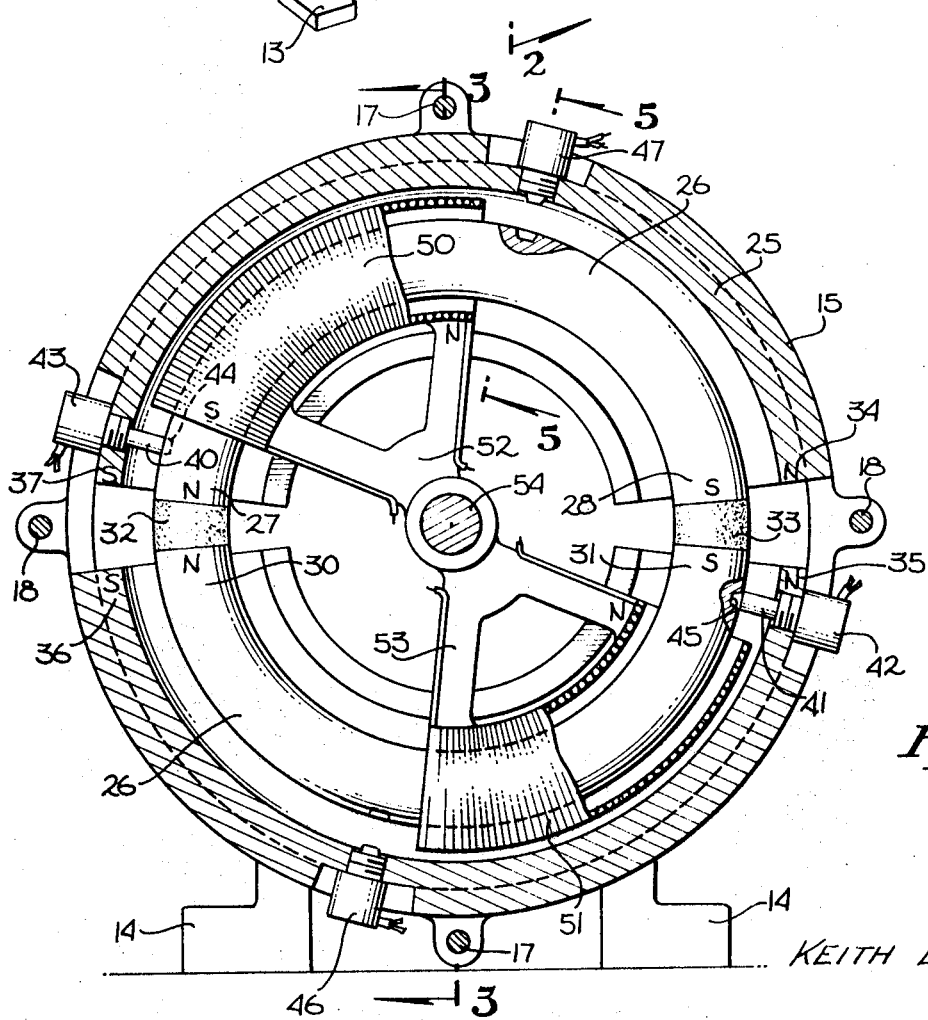
FIG. 2 is an enlarged cross-sectional view of the power source illustrated in FIG. 1 as taken in the direction of arrows 2—2 thereof.

FIG. 2 further discloses that the outer magnet 25 and inner magnet 26 are composed of semicircular segments provided with common or similar polarized ends facing each other. For example, ends 27 and 28 of one semicircular segment face ends 30 and 31 of the other semicircular segment. Only removable insulative material 32 and 33 separates the ends of the magnets segments forming the circular magnet or magnetic ring 26. Such material is for rigidity and to effect remagnetization of magnets. Similarly, it is to be noted that magnet 25 is composed of a pair of semicircular magnet segments separated by an air gap between their opposing end pieces which are of the same polarity. For example, end 34 and 35 are facing one another and are of the same magnetic field polarity and therefore are in repulsion. Their opposite ends 36 and 37 are of the same polarity and therefore are in repulsion.

The inner magnet 26 is supported by any suitable means, such as a pair of pins 40 and 41. The pins are movable carried in conventional solenoid switches 42 and 43 so as to move toward and away from the ringlike, inner magnet 26. At certain locations along the outer periphery of the inner ring magnet, there are provided recesses, such as recesses 44 and 45, adapted to insertably receive the ends of the pins 40 and 41, respectively. When the pins are so engaged, the inner ring magnet 26 is supported within the confines of the outer magnet 25. Furthermore, it is also to be noted that another pair of solenoid operated switches 46 and 47 are provided which also include pins adapted to be selectively engaged with corresponding recesses in the ring magnet 26. The former and latter sets of pins are designed to operate alternatively so as to support the inner ring magnet by either set of pins according to control signals supplied to the respective pairs of solenoid switches. Other mechanisms may be employed for supporting the inner ring magnet 26. Alternating support members may be pivotally mounted on an axle for rocking back and forth so as to support the magnet at locations not encircled by either of the coils (to be described later). The rocking movement may be suitably programmed so as not to interfere with any moving parts or components of the apparatus.

In FIG. 2, it can be seen further that the ring magnet 26 is partially encased by a pair of coil elements 50 and 51, respectively. Coil elements 50 and 51 may be referred to as electromagnets carried on the ends of webs 52 and 53 consisting quadrants which are in turn secured to a shaft 54. The opposite ends of the wire forming the coil elements 50 and 51 extend along the quadrant waves 52 and 53 and terminate in a commutator arrangement within housing 22. It can be seen that as the elements 50 and 51 move about the inner ring magnet 25 within the space separating magnet 26 from magnet 25, the separate pair of support pins for mounting ring magnets 26 must be alternatively actuated to permit uninhibited passage of the coil elements.

Therefore, it can be seen that by energizing the elements 50 and 51, a polarity is established which is opposite (and attractive) to the polarity of the ring magnet 26 as the forward side of the coils approach the adjacent ends of the ring magnet as well as the outer magnet adjacent ends. For example, as illustrated, the adjacent ends of the magnet segments for the inner magnet 26 and the outer magnet 25, located along the left hand side of the drawing, are indicated as "S" and "N" polarity respectively, while the opposing ends along the right-hand side of the drawing are indicated by polarity "S" and "N" respectively. The indication for the coil segment 50 indicates a polarity "S" approaching the "N" polarity of the inner magnet while the forward side of coil segment 51 is indicated as being of "N" polarity as it approaches a magnetic field of "S" polarity. Obviously, attraction will occur which will cause the quadrant elements to move counterclockwise to rotate shaft 54. This phenomenon is easily established by employing a conventional "cow" magnet with a coil of wire slidably mounted thereon such that when electrical energy is supplied to the coil, the coil, the coil will move axially from the magnet so as to be separated therefrom as far as possible.

Sufficient attraction of the leading end of the coils with respect to the magnetic fields is available to cause the leading or forward side of the coil element to rapidly approach the opposite field polarity, to cross the magnetic field and to progress beyond after crossover. In some instances, depending upon criticality of parts, the coil segments would have a tendency to reverse and go back to the crossed over polarity field of opposite value. However, in an advanced design of the present invention, a plurality of stages are provided as shown in FIG. 3, wherein as the coil segments associated with the first stage to go beyond the magnetic field of opposite polarity, the coil segments of the second stage are approaching. This sequence takes place with respect to the third and fourth stages as well.

Referring now to FIG. 3, it can be seen that the shaft 54 is rotatably carried on friction-free bearings 55 and 56, respectively. The commutators employed for selectively energizing the solenoid switches and the coil segments are suitably housed within housing 22. Furthermore, it can be seen that the wires from the coil segments extend down the quadrant webs 52 and 53 and then extend along the shaft 54. It is to be noted that the inner diameter of each outer magnet 25 is formed with a slot 60 so as to permit the associated webs 52 and 53 to rotate without encountering interference. Also, it can be seen that the magnets are arranged in a series or staggered staged relationship. For example, four stages are shown in FIG. 3 wherein the coil elements are illustrated in a different position from each other so that a continuous and smooth work output can be obtained from shaft 54. The staggered relationship of adjacent magnets is diagrammatically illustrated in FIG. 4 wherein four inner ring magnets are illustrated such that the opposing ends of their segments are in different axial alignment. All of the ring magnets are coaxial with respect to each other but the high density magnetic fields are offset with respect to adjacent high density magnetic fields. Consequently, the coil elements associated with each of the inner ring magnets will be offset in a similar fashion as shown in FIG. 3.

With reference to FIG. 5, an enlarged cross-sectional view of a portion of the core or inner magnet 26 is illustrated in connection with its spaced relationship to an outer magnet 25 and a switch mechanism 46. The slot 60 formed in the outer magnet 25 is illustrated so as to permit passage of associated core element webs 52 and 53 as the magnetic fields attract the coil elements.

Referring now to FIG. 6, a diagrammatic illustration is presented in which the pulse energization of the various coils 50 and 51 are effected by a control means 62, such as a commutator that suitably supplies current from a battery 63 to the coils 50 and 51 in each stage. Also, the control means supplies suitable current to the switch means 42 and 43 as well as 46 and 47 so that inner magnetic cores 26 are suitably supported as the coils 50 and 51 rotate thereabout in a circular manner. A suitable ON/OFF switch 64 is provided.

From the foregoing, it can be seen that the apparatus of the present invention provides a novel magnetic power source employing the natural forces of magnetism in such a manner that a movable electromagnet will be drawn to a fixed magnetic field and caused to pass the fixed magnetic filed so as to create mechanical displacement between the fixed magnetic field and the movable magnetic field. Such a power source represents a tremendous advantage over conventional power sources inasmuch as electrical or electronic conversion systems are not necessary for the operation of the power source. Furthermore, not only can the present invention be employed as a magnetic motor but, is is contemplated that applications involving generators are included as well. It is to be understood that other uses are envisioned by the present invention and that additional magnetic stages may be employed which will have the advantageous effect of increasing the power output from the apparatus. Longevity of the power source if a function of the magnetic force available in the permanent magnets employed whether they are of the bar magnet type or the horseshoe magnet type.

If desired, rollers may be employed within the gap between the inner magnet and the coil portions and in the gap between the outer magnet and the coil portions. A magnetic lock is effected by the inner hysteresis of the core to be supported by the outer magnet. Also, any one stage or level of the device may be comprised of two or more magnet segments. It is to be noted that in addition to each coil segment 50 and 51 having opposite polarized ends as previously described, each coil carries an external or outward magnetic field which is "N" and an inner or inward magnetic field which is indicated in FIG. 3 as "S." These minor fields react with the fields of the inner core magnet and the outer ring magnet to effectively eliminate or substantially reduce drag as the coils move in their common circular path.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A dynamoelectric stepping arrangement comprising:
   a fixed permanent magnet;
   a movable electromagnet in close proximity to said fixed permanent magnet;
   the poles of said magnets being arranged in attraction relationship;
   electrical means operably coupled to said electromagnet for selectively energizing said electromagnet whereby a high density magnetic field appears at the opposite ends thereof in opposite polarity to said permanent magnet and whereby said electromagnet moves with respect to said permanent magnet and said permanent magnet is a ring composed of a pair of semicylindrical circular segments having ends of similar polarity facing each other.

2. The invention as defined in claim 1 wherein said electromagnet is a pair of coils encircling opposite portions of said ring magnet.

3. The invention as defined in claim 2 including an outer permanent magnet enclosing said coils and said first mentioned ring magnet and composed of a pair of semicircular magnets having their ends of similar polarity facing each other so as to radiate a magnetic field additive to the fields radiated by said first mentioned magnet.

4. The invention as defined in claim 3 wherein a plurality of stages are provided in coaxial relationship and wherein each one of said stages is offset magnetically with respect to adjacent stages.

5. The invention as defined in claim 3 including releasable means for supporting said inner magnet with respect to said outer magnet; and
   fixed means of support with respect to a hysteresis means of support.

6. The invention as defined in claim 3 wherein said coils are fixed to a rotatable shaft.

7. The invention as defined in claim 1 wherein
   said fixed permanent magnet constitutes an inner ring magnet;
   a second fixed permanent magnet surrounding said inner magnet constituting an outer magnet;
   each of said inner and outer magnets being characterized by a pair of semicircular magnets having their ends of similar or like polarity facing each other so as to establish a field of high density magnetic force on opposite sides of said inner and outer magnets separated by the center of said magnets; and
   said electromagnetic constitutes a pair of coils movably disposed about said inner magnet and adapted to move towards said high density magnetic forces when pulsed by said electrical means.

8. The invention as defined in claim 7 including output means operably connected to said coils for converting coil movement into mechanical displacement of said output means effective to transfer torque loads.